(12) United States Patent
Wang

(10) Patent No.: US 10,490,228 B2
(45) Date of Patent: Nov. 26, 2019

(54) CASING AND COMPUTER INCLUDING THE SAME

(71) Applicant: WISTRON CORP., New Taipei (TW)

(72) Inventor: Ching-Hua Wang, New Taipei (TW)

(73) Assignee: WISTRON CORP., New Taipei (TW)

( * ) Notice: Subject to any disclaimer, the term of this patent is extended or adjusted under 35 U.S.C. 154(b) by 0 days.

(21) Appl. No.: 16/000,477

(22) Filed: Jun. 5, 2018

(65) Prior Publication Data

US 2019/0252004 A1 Aug. 15, 2019

(30) Foreign Application Priority Data

Feb. 13, 2018 (TW) .............................. 107105154 A

(51) Int. Cl.
| | | |
|---|---|---|
| *G06F 1/16* | (2006.01) | |
| *G11B 33/02* | (2006.01) | |
| *G11B 33/12* | (2006.01) | |
| *G06F 1/18* | (2006.01) | |

(52) U.S. Cl.
CPC .............. *G11B 33/02* (2013.01); *G06F 1/181* (2013.01); *G11B 33/121* (2013.01); *G06F 1/16* (2013.01)

(58) Field of Classification Search
None
See application file for complete search history.

(56) References Cited

U.S. PATENT DOCUMENTS

| | | | | | |
|---|---|---|---|---|---|
| 5,340,340 | A | * | 8/1994 | Hastings | ................. G06F 1/181 312/223.1 |
| 9,207,709 | B2 | * | 12/2015 | Xie | .......................... G06F 1/16 |
| 9,520,158 | B1 | * | 12/2016 | Lyu | ....................... G11B 33/124 |
| 9,578,761 | B2 | * | 2/2017 | Chitaka | ..................... H05K 5/00 |
| 9,795,050 | B2 | * | 10/2017 | Chen | ..................... G11B 33/142 |
| 9,814,147 | B2 | * | 11/2017 | Igari | ....................... H05K 5/006 |
| 9,817,449 | B2 | * | 11/2017 | Mau | .......................... G06F 1/18 |
| 10,111,358 | B2 | * | 10/2018 | Wu | ....................... H05K 7/1489 |
| 2013/0279129 | A1 | * | 10/2013 | Xie | ........................... G06F 1/16 361/752 |

FOREIGN PATENT DOCUMENTS

| | | |
|---|---|---|
| TW | 408258 B | 10/2000 |
| TW | M460502 U | 8/2013 |
| TW | M510035 U | 10/2015 |

OTHER PUBLICATIONS

Taiwanese Office Action for corresponding application No. 107105154, dated Aug. 6, 2018.

* cited by examiner

*Primary Examiner* — Courtney L Smith
*Assistant Examiner* — Rashen E Morrison
(74) *Attorney, Agent, or Firm* — Maschoff Brennan

(57) ABSTRACT

A casing is configured for a data storage device to be disposed thereon. The casing includes a chassis and an operation member. The chassis includes a front plate, and the front plate has a plurality of assembling slots. Each of the assembling slots has a retaining part and a releasing par. A width of the releasing part is larger than a width of the retaining part. The assembling slots are configured for a plurality of fasteners of the data storage device to be disposed therethrough, and the plurality of fasteners are configured to be slid between the retaining parts and the releasing parts of the assembling slots. The operation member is slidably disposed on the front plate and slidable between a retaining position and a releasing position. When the operation member is in the retaining position, the operation member retains the fasteners at the retaining parts.

13 Claims, 13 Drawing Sheets

CASING AND COMPUTER INCLUDING THE SAME

CROSS-REFERENCE TO RELATED APPLICATIONS

This non-provisional application claims priority under 35 U.S.C. § 119(a) on Patent Application No(s). 107105154 filed in Taiwan on Feb. 13, 2018, the entire contents of which are hereby incorporated by reference.

TECHNICAL FIELD

The disclosure relates to a casing and a computer including the same, more particularly to a casing configured for a data storage device to be disposed thereon and a computer including the same.

BACKGROUND

Conventionally, a hard drive disc (HDD) is mounted in a computer casing by directly screwing or via a metal or plastic bracket mounted on the computer casing.

However, the HDD directly screwed on the computer casing is inconvenient when replacing, and the manufacturing cost will be increased by using the bracket to mount the HDD.

Therefore, how to efficiently install and replace the HDD on the computer casing while maintaining low manufacturing cost is an important topic in this field.

SUMMARY

One embodiment of the disclosure provides a casing, which is configured for a data storage device to be disposed thereon. The casing includes a chassis and an operation member. The chassis includes a front plate, and the front plate has a plurality of assembling slots. Each of the plurality of assembling slots has a retaining part and a releasing part. A width of the releasing part is larger than a width of the retaining part. The plurality of assembling slots are configured for a plurality of fasteners of the data storage device to be disposed therethrough, and the plurality of fasteners are configured to be slid between the retaining parts and the releasing parts of the plurality of assembling slots. The operation member is slidably disposed on the front plate and slidable between a retaining position and a releasing position. When the operation member is in the retaining position, the operation member retains the plurality of fasteners at the retaining parts.

One embodiment of the disclosure provides a computer, which includes a data storage device and a casing. The data storage device includes a device body and a plurality of fasteners that are disposed on the device body. The casing includes a chassis and an operation member. The chassis includes a front plate, and the front plate has a plurality of assembling slots. Each of the assembling slots has a retaining part and a releasing part. A width of the releasing part is larger than a width of the retaining part. The plurality of fasteners are slidably disposed through the plurality of assembling slots and the plurality of fasteners are configured to be slid between the retaining parts and the releasing parts of the plurality of assembling slots. The operation member is slidably disposed on the front plate and slidable between a retaining position and a releasing position. When the operation member is in retaining position, the operation member retains the plurality of fasteners at the retaining parts.

BRIEF DESCRIPTION OF THE DRAWINGS

The present disclosure will become more fully understood from the detailed description given hereinbelow and the accompanying drawings which are given by way of illustration only and thus are not intending to limit the present disclosure and wherein.

DETAILED DESCRIPTION

Figure 1:
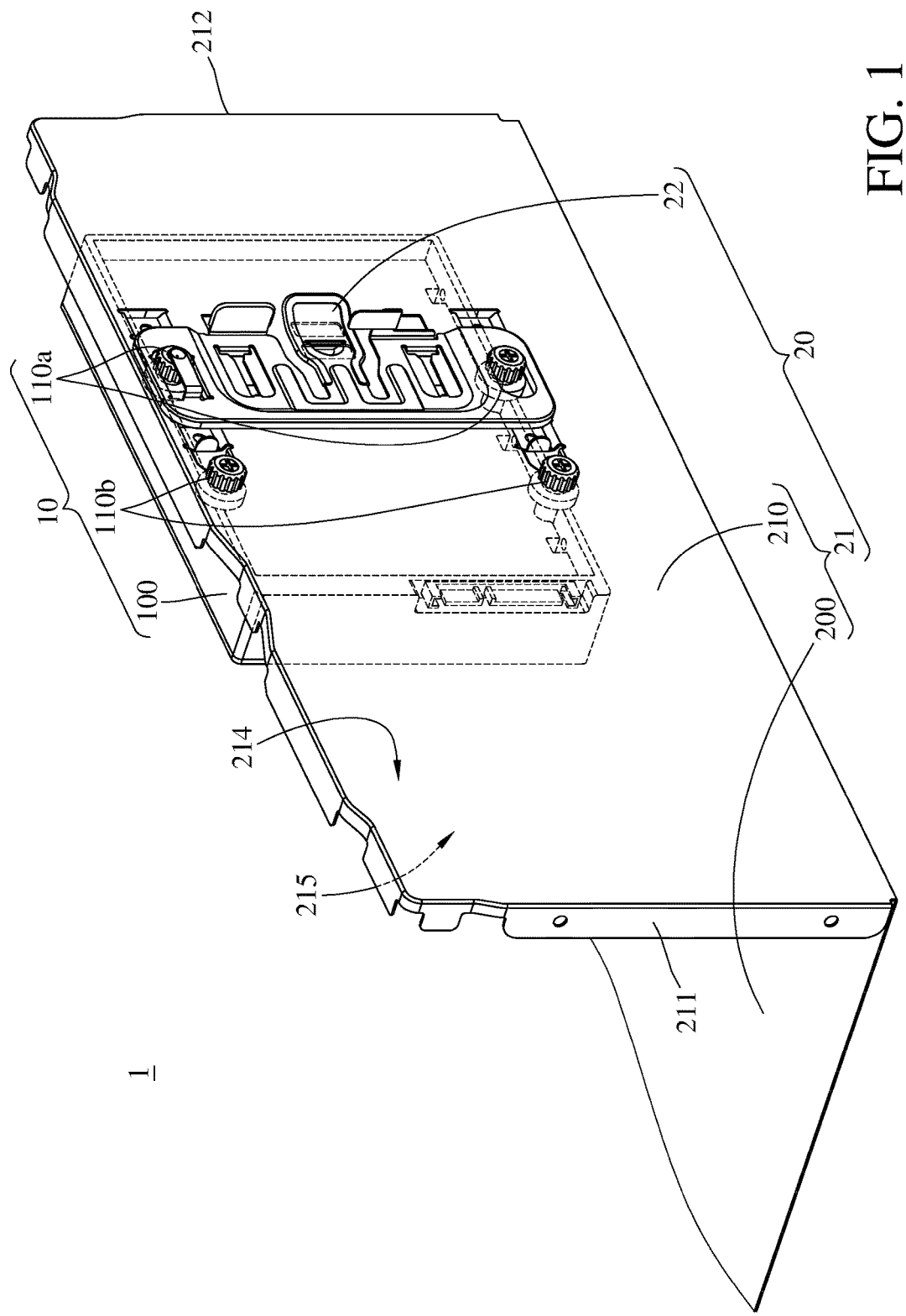
FIG. 1 is a partial perspective view of a computer in accordance with a first embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known accommodation structures and devices are schematically shown in order to simplify the drawing.

Figure 2:
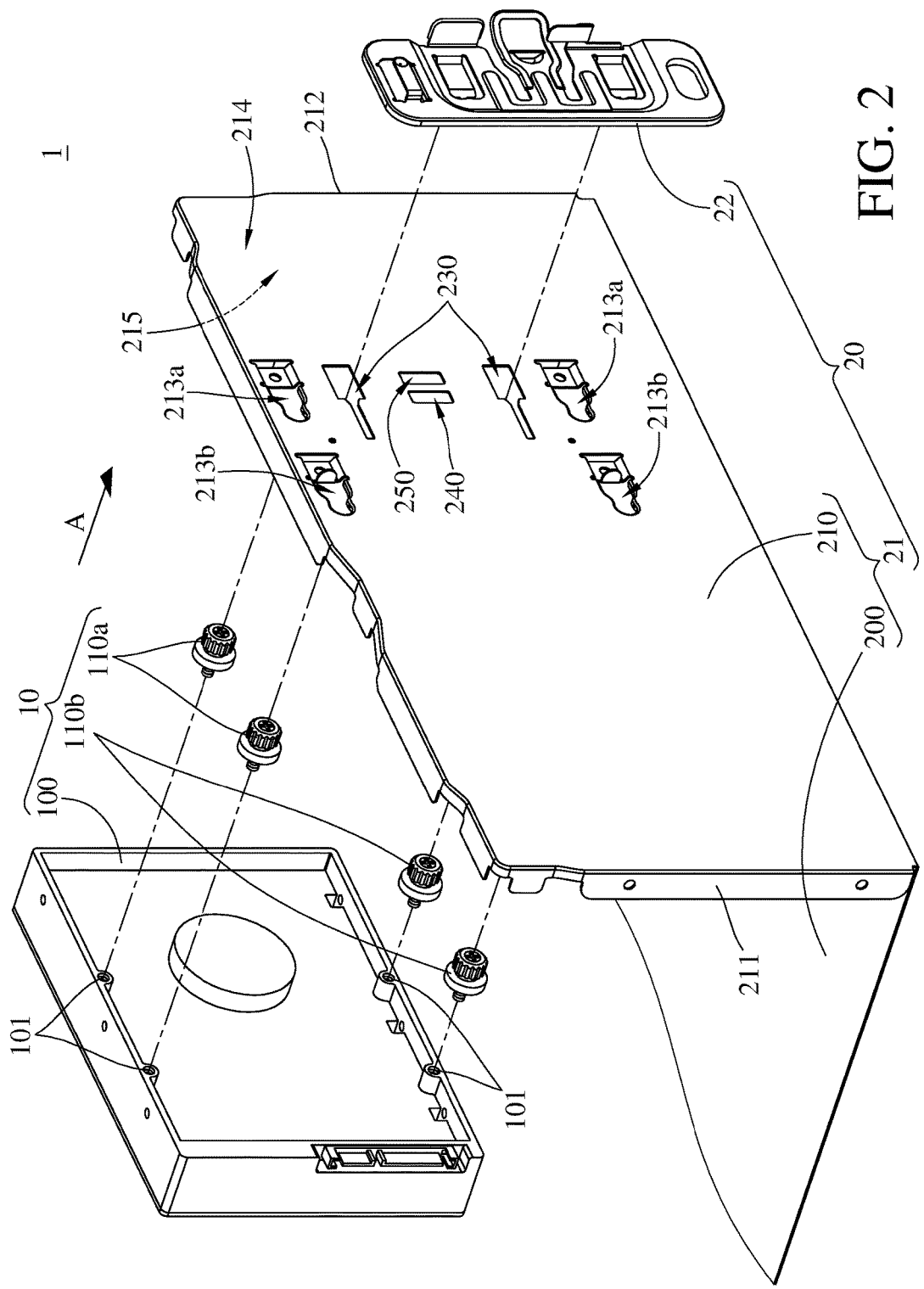
FIG. 2 is an exploded view of the computer in FIG. 1.
Figure 3:
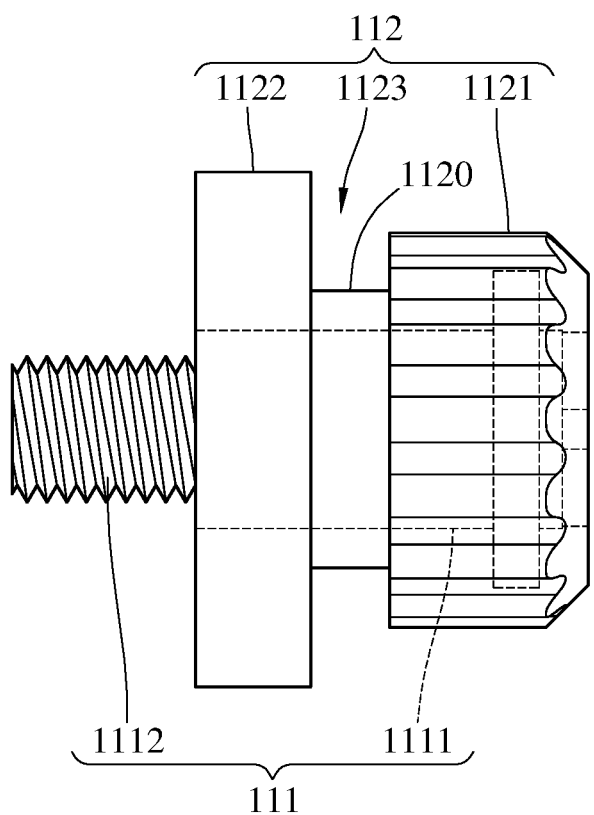
FIG. 3 is a side view of a fastener in FIG. 1.

Refer to FIG. 1 to FIG. 3. FIG. 1 is a partial perspective view of a computer in accordance with a first embodiment of the disclosure, FIG. 2 is an exploded view of the computer in FIG. 1, and FIG. 3 is a side view of a fastener in FIG. 1.

In this embodiment, a computer 1 is provided. It is noted that the computer 1 shown in the figures is placed horizontally for the purpose of better explanation, but the present disclosure is not limited thereto. The computer 1 may be placed vertically according to actual requirements.

The computer 1 includes a data storage device 10 and a casing 20. The data storage device 10 is, for example, a 3.5-inch hard drive. The data storage device 10 includes a device body 100 and a pair of fasteners 110a and a pair of fasteners 110b. In one example, the total quantity of the fasteners 110a and 110b is four, but the present disclosure is not limited thereto.

In this embodiment, the device body 100 has a plurality of screw holes 101. In one example, the screw holes 101 are the screw holes inherently configured on the bottom of a conventional 3.5-inch hard drive for the installation of a heat dissipation module.

In this embodiment, the fasteners 110a and 110b are, for example, shock absorbing screws. Each of the fasteners 110a and 110b includes a screw portion 111 and a buffer sleeve 112. The screw portion 111 is, for example, a bolt, which includes a head part 1111 and a threaded part 1112 connected to each other. The threaded parts 1112 are used to be screwed into the screw holes 101 of the device body 100. It is noted that the screw holes 101 of the device body 100 are the aforementioned screw holes configured for the installation of the heat dissipation module. Therefore, by the use of the existing screw holes, the cost of manufacturing additional screw holes or engagement structures is saved.

The buffer sleeve 112 is, for example, made of rubber so that the buffer sleeve 112 is flexible. The buffer sleeve 112 includes a wrapping portion 1120, a first annular protrusion 1121, and a second annular protrusion 1122. The wrapping portion 1120 is sleeved on the head part 1111 of the screw portion 111. The first annular protrusion 1121 and second annular protrusion 1122 both protrude from the wrapping portion 1120, and the first annular protrusion 1121 is spaced apart from the second annular protrusion 1122. An engaging slot 1123 is formed between the first annular protrusion 1121 and the second annular protrusion 1122. In addition, the second annular protrusion 1122 is closer to the threaded part 1112 than the first annular protrusion 1121, and a length that the second annular protrusion 1122 protrudes from the wrapping portion 1120 is larger than a length that the first annular protrusion 1121 protrudes from the wrapping portion 1120. In this embodiment, the buffer sleeve 112 is formed of a single piece and is sleeved on the head part 1111 of the screw portion 111 by injection molding, but the present disclosure is not limited thereto.

The casing 20 includes a chassis 21 and an operation member 22. The chassis 21 includes a front plate 210, a side plate 200, two first guiding parts 230, a first engaging part 240, and a third engaging part 250.

Figure 4:
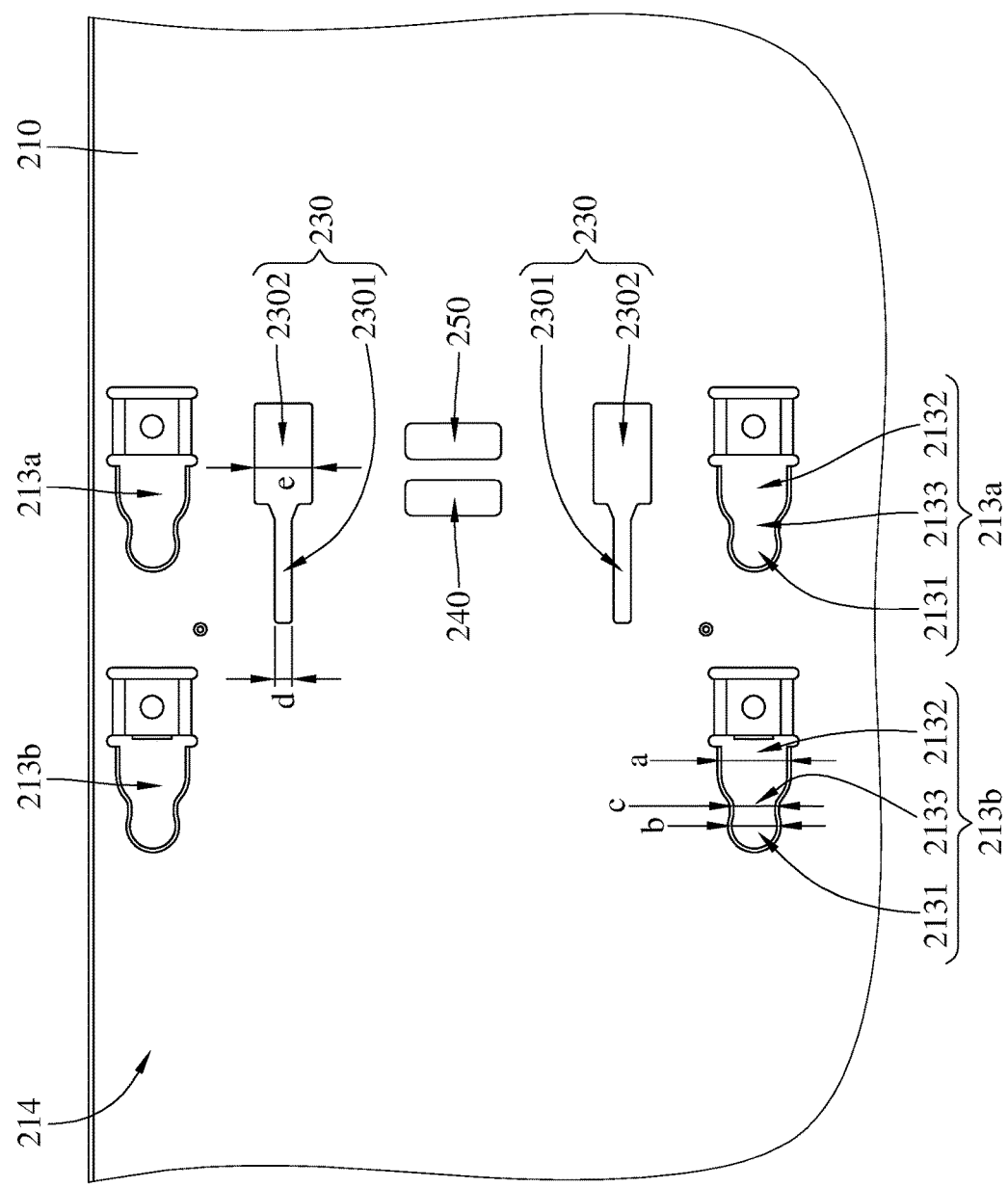
FIG. 4 is a partial planar view of a chassis in FIG. 1.
Figure 5:
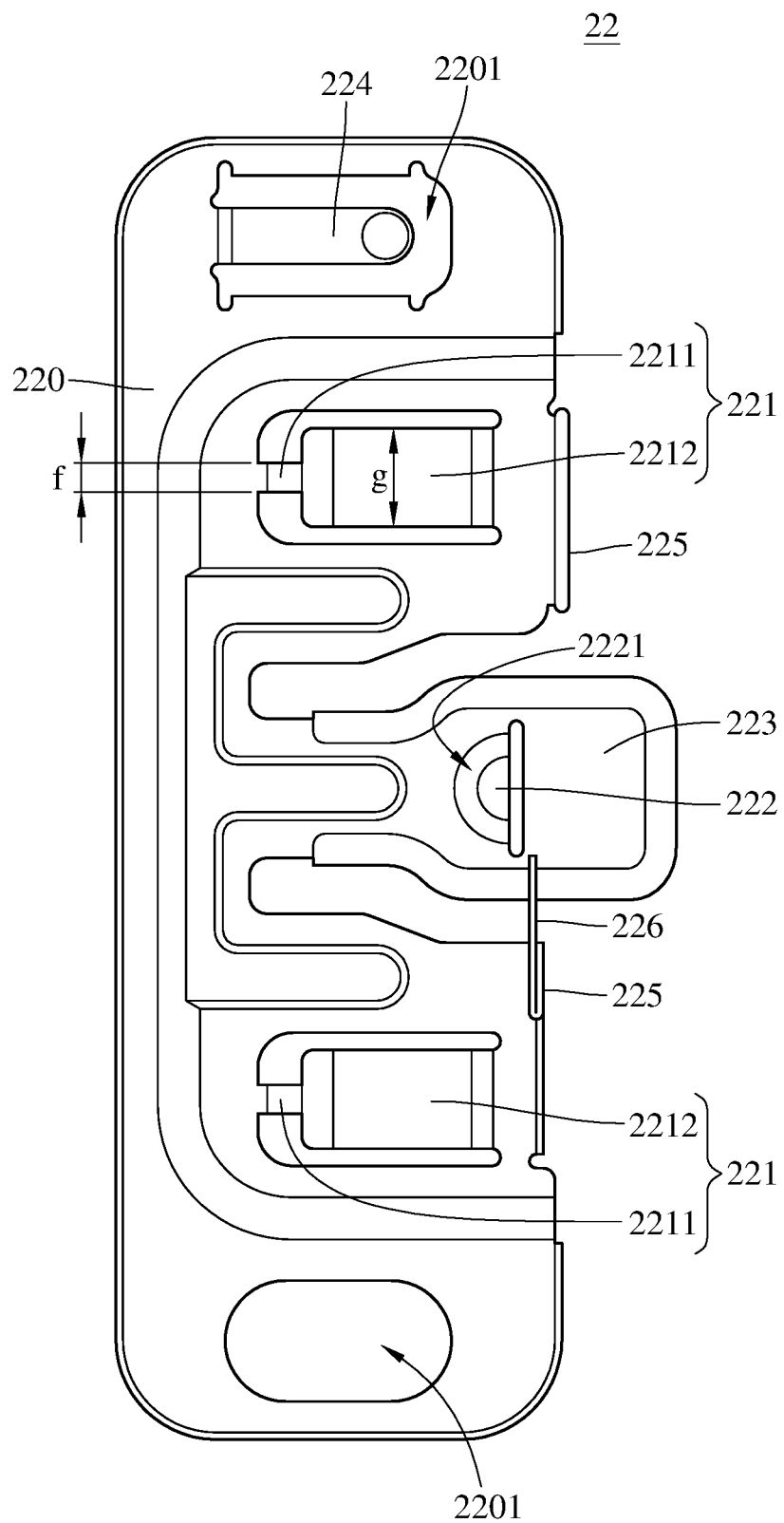
FIG. 5 is a planar view of an operation member in FIG. 1.
Figure 6:
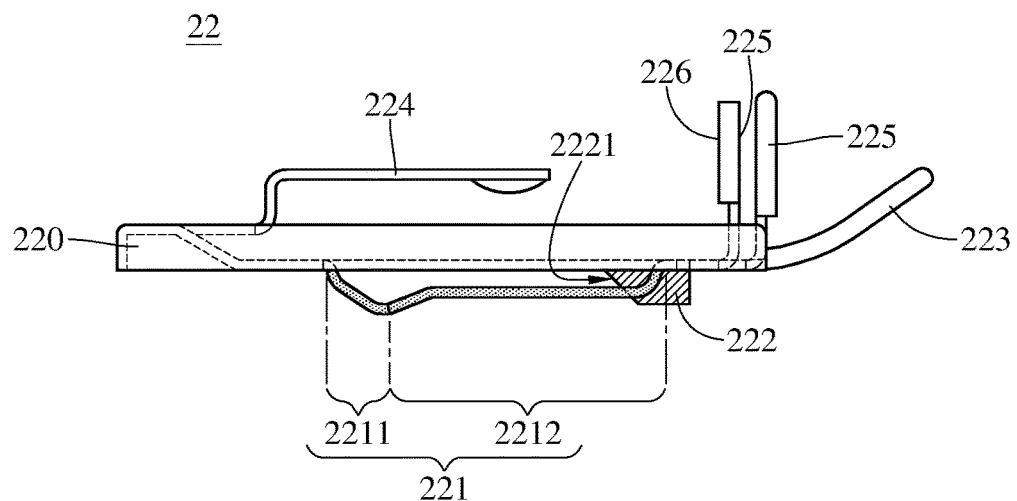
FIG. 6 is a side view of the operation member in FIG. 1.

Refer to FIG. 4 to FIG. 6. FIG. 4 is a partial planar view of a chassis in FIG. 1, FIG. 5 is a planar view of an operation member in FIG. 1, and FIG. 6 is a side view of the operation member in FIG. 1.

In this embodiment, the front plate 210 and the side plate 200 are connected and substantially orthogonal to each other. The front plate 210 is, for example, a front board of a conventional desk top computer configured for hardware, such as optical drives (not shown) and power buttons (not shown) to be disposed thereon. The side plate 200 is, for example, another board of the desk top computer configured for the installation of a mother board (not shown). The front plate 210 has a first side 211, a second side 212 opposite to the first side 211, a plurality of assembling slots 213a and 213b, a first assembling surface 214, and a second assembling surface 215 opposite to the first assembling surface 214. In this embodiment, the first side 211 and the second side 212 are two short sides of the front plate 210, but the present disclosure is not limited thereto. The assembling slots 213a and 213b are located between the first side 211 and the second side 212. A normal vector of the second assembling surface 215 points toward the device body 100.

In this embodiment, the quantity of the assembling slots 213a is two, and the quantity of the assembling slots 213b is two, but the present disclosure is not limited thereto. The assembling slots 213a and 213b form a pear-shaped hole, which having a convergent-divergent shape. Each of the assembling slots 213a and 213b has a retaining part 2131, a releasing part 2132, and a narrowed neck part 2133 between the retaining part 2131 and the releasing part 2132. The retaining part 2131 is closer to the first side 211 of the front plate 210 than the releasing part 2132. A width "a" of the releasing part 2132 is larger than a width "b" of the retaining part 2131, and the width "b" of the retaining part 2131 is larger than a width "c" of the narrowed neck part 2133.

The buffer sleeves 112 of the fasteners 110a and 110b are respectively disposed through the assembling slots 213a and 213b of the front plate 210, and the buffer sleeves 112 are slidable between the retaining parts 2131 and the releasing parts 2132 of the assembling slots 213a and 213b. In detail, a diameter of the first annular protrusion 1121 of the buffer sleeve 112 is larger than the width "b" of the retaining part 2131 and smaller than the width "a" of the releasing part 2132, such that the fasteners 110a and 110b are detachable from the releasing parts 2132 but are undetachable from the retaining parts 2131. Furthermore, a diameter of the wrapping portion 1120 of the buffer sleeve 112 is smaller than the width "b" of the retaining part 2131, such that when the fasteners 110a and 110b are located at the retaining parts 2131 of the assembling slots 213a and 213b, edges of the front plate 210 forming the retaining parts 2131 of the assembling slots 213a and 213b are engaged in the engaging slots 1123 between the first annular protrusions 1121 and the second annular protrusions 1122 of the buffer sleeves 112. Moreover, a diameter of the second annular protrusion 1122 is larger than the width "a" of the releasing part 2132, such that when the buffer sleeves 112 are disposed through the assembling slots 213a and 213b, the second annular protrusions 1122 can prevent the fasteners 110a and 110b from moving in a direction "A" and can reduce the impact between the front plate 210 and the data storage device 10, so as to prevent the front plate 210 and the data storage device 10 from directly colliding to each other.

In this embodiment, the width "c" of the narrowed neck part 2133 of the assembling slots 213a and 213b is slightly smaller than the diameter of the wrapping portion 1120, thus there would be a clicking feeling/sound while the buffer sleeves 112 are sliding through the narrowed neck parts 2133 from the releasing parts 2132 to the retaining parts 2131, and it helps the user to know whether the fasteners 110a and 110b are moved into the retaining parts 2131. However, the narrowed neck parts 2133 are optional. In other embodiments, each assembling slots may only have the retaining part and the releasing part which are directly connected to each other.

As shown in FIG. 4, the two first guiding parts 230, the first engaging part 240, and the third engaging part 250 are all located on the front plate 210. In this embodiment, each of the first guiding parts 230, the first engaging part 240, and the third engaging part 250 is a through hole. The two first guiding parts 230 are located between the two assembling slots 213a, and the assembling slots 213a and the first guiding parts 230 are substantially arranged along a direction parallel to an extending direction of the short sides (i.e., the first side 211 or the second side 212) of the front plate 210. Each of the first guiding parts 230 includes a first slot part 2301 and a second slot part 2302, and a width "e" of the second slot part 2302 is larger than a width "d" of the first slot part 2301.

In this embodiment, the first engaging part 240 and the third engaging part 250 are located between the two first guiding parts 230, and the first engaging part 240 is closer to the first side 211 of the front plate 210 than the third engaging part 250.

As shown in FIG. 5 and FIG. 6, the operation member 22 includes a main body 220, two second guiding parts 221, a second engaging part 222, an operating part 223, an elastic grounding arm 224, two reinforcement protrusions 225, and a movement-restriction protrusion 226.

The main body 220 has two movement restricting slots 2201, each of the movement restricting slots 2201 is a through hole respectively corresponding to the fasteners 110a, and the fasteners 110a are slidable in the movement restricting slots 2201. However, the movement restricting slot 2201 may be replaced by a bulge structure defining a groove configured for the fastener to be slidable therein.

The second guiding parts 221 are located on the main body 220. The second guiding parts 221 are slidably disposed in the first guiding parts 230, such that the operation member 22 is slidable between a retaining position and a releasing position relative to the front plate 210. In detail, in this embodiment, each of the second guiding parts 221 includes a first slide piece 2211 and a second slide piece 2212. A width "g" of the second slide piece 2212 is larger than a width "f" of the first slide piece 2211, and the width "g" of the second slide piece 2212 is smaller or equal to the width "e" of the second slot part 2302. Furthermore, as shown in FIG. 6, the second guiding part 221 has two inclined portions at either end connected to the main body 220, such that there is a step between the second slide piece 2212 and the main body 220, and the purpose of which will be described later on. Additionally, the second slide piece 2212 has an inclined portion extending away from the main body 220 at one end connected to the first slide piece 2211.

The second engaging part 222 is located on the main body 220. In this embodiment, the second engaging part 222 is a protrusion detachably engaged with the first engaging part 240 or the third engaging part 250 of the chassis 21. As shown in FIG. 6, the second engaging part 222 has an inclined guiding surface 2221 configured on the protrusion. One end of the inclined guiding surface 2221 away from the main body 220 is closer to the second side 212 of the front plate 210 than another end of the inclined guiding surface 2221 connected to the main body 220. As such, during the movement of the operation member 22 from the releasing position to the retaining position, the second engaging part 222 is detached from the third engaging part 250 while the inclined guiding surface 2221 is pushed along the direction "A" by a part of an edge of the main body 220 forming the third engaging part 250.

The operating part 223 is connected to the second engaging part 222, and the operating part 223 is slightly bendable with respect to the main body 220 for moving the second engaging part 222 to be engaged or disengaged from the first engaging part 240 or the third engaging part 250. However, the operating part 223 is optional. In other embodiments, the operation member may not have the operating part, and alternatively, the second engaging part may be disengaged from the first engaging part or third engaging part by using an external tool.

The elastic grounding arm 224 is connected to the main body 220 and covers a part of one of the movement restricting slots 2201. In this embodiment, one surface of the head part 1111 of the screw portion 111 away from the threaded part 1112 is exposed from the wrapping portion 1120 of the buffer sleeve 112. When the fasteners 110a and 110b are located at the retaining parts 2131, and the operation member 22 is in the retaining position, the elastic grounding arm 224 presses against the head part 1111 of the head part 1111 of one of the fasteners 110a (or one of the fasteners 110b) so as to connect the data storage device 10 to ground. In this embodiment, there is only one elastic grounding arm 224, but the present disclosure is not limited thereto. In other embodiments, the operation member may have more than one elastic grounding arm in order to improve the ground effect. Furthermore, in some embodiments, if the chassis has another grounding component, then the operation member may not have the elastic grounding arm.

The reinforcement protrusions 225 protrude from an edge of a long side of the main body 220 in order to enhance the structural strength of the operation member 22, such that the operation member 22 is not easily bent along its long side.

The movement-restriction protrusion 226 is connected to one of the reinforcement protrusions 225 and located at one side of the operating part 223 away from the front plate 210, so as to restrict the bending range of the operating part 223, thereby preventing the operating part 223 from being overly bent and broken.

However, both the reinforcement protrusion 225 and the movement-restriction protrusion 226 are optional. In other embodiments, the operation member may not have the reinforcement protrusion and the movement-restriction protrusion.

The assembly procedure of the computer 1 of the present disclosure is described in the following paragraphs.

Figure 7:
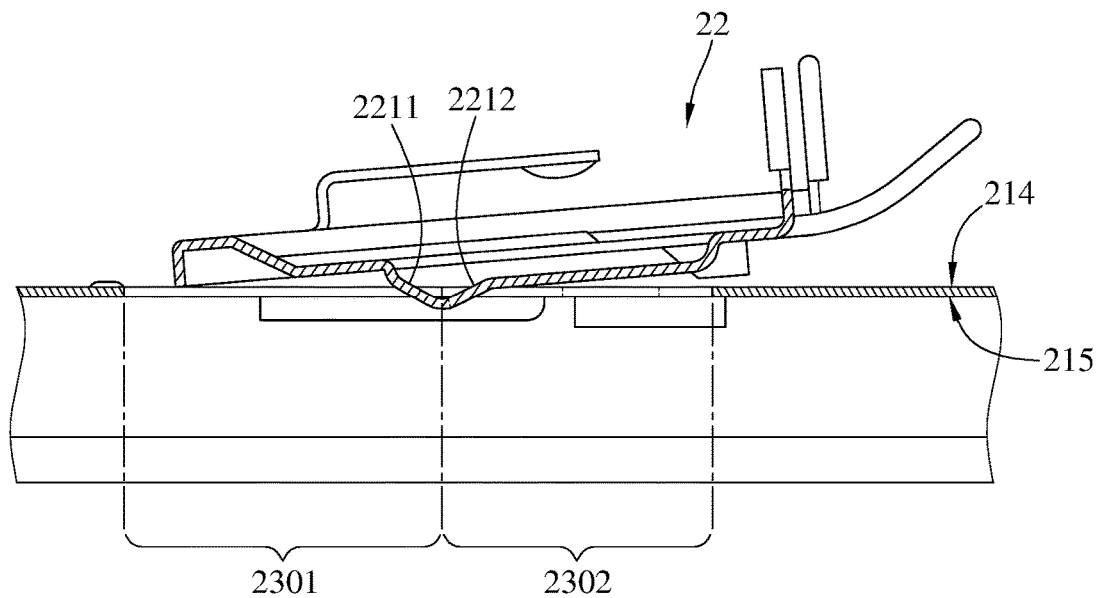
FIG. 7 is a side view showing that the operation member in FIG. 1 is inclined relative to the front plate.
Figure 8:
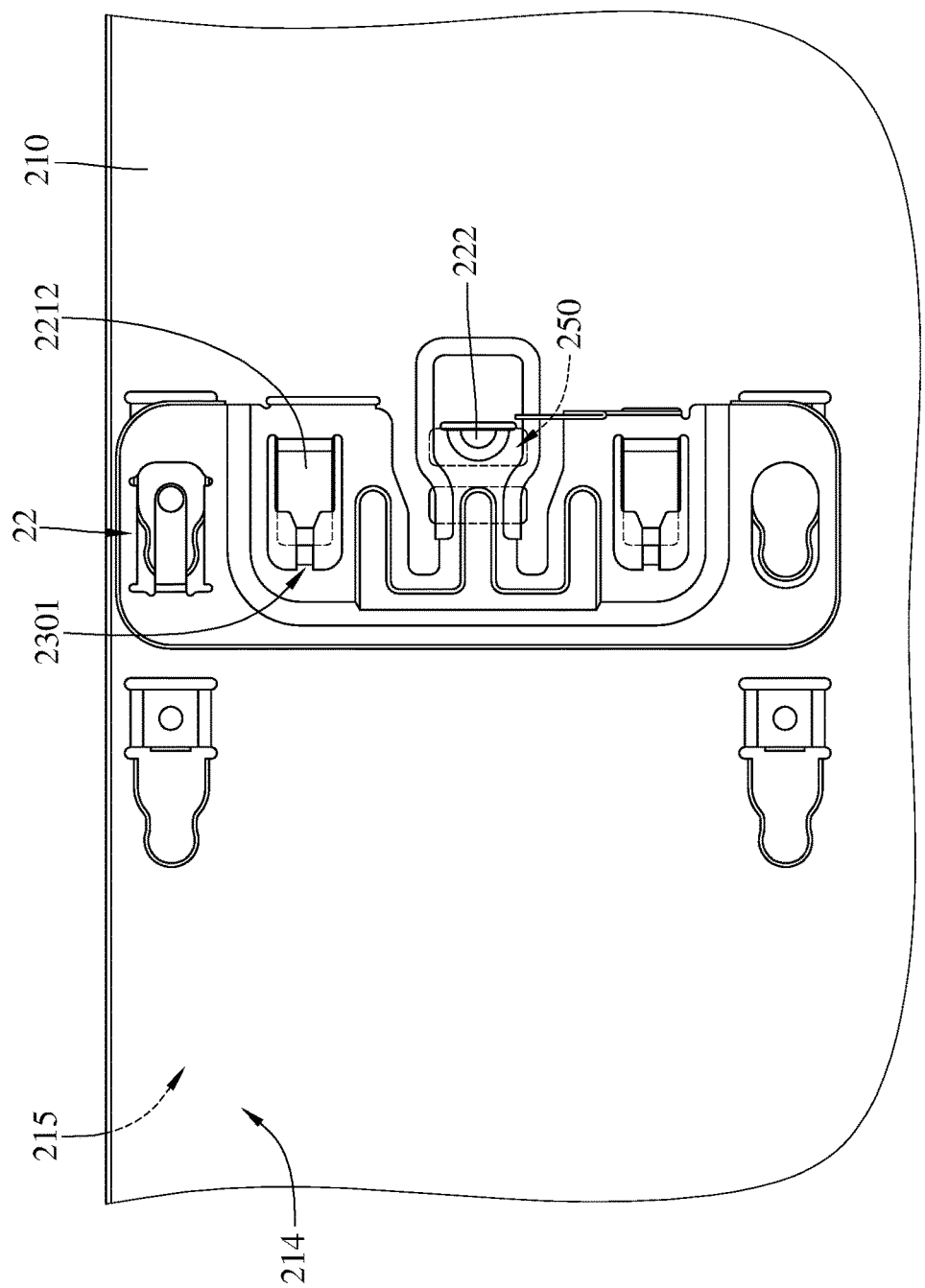
FIG. 8 is a planar view showing that the operation member in FIG. 1 is in a releasing position with respect to the front plate.
Figure 9:
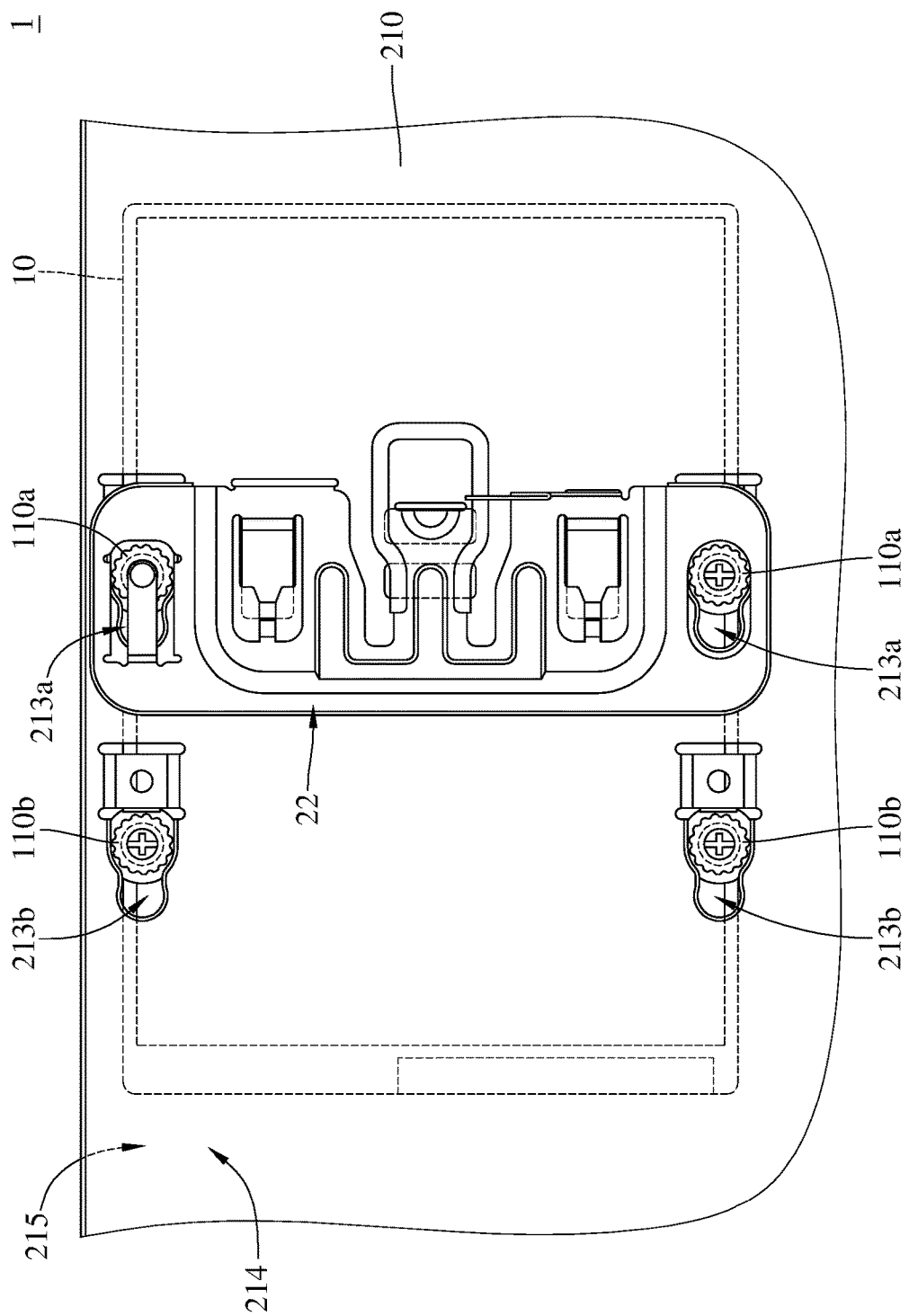
FIG. 9 is a planar view showing that the operation member in FIG. 1 is in the releasing position and fasteners in FIG. 1 are located at releasing parts of the assembling slots.
Figure 10:
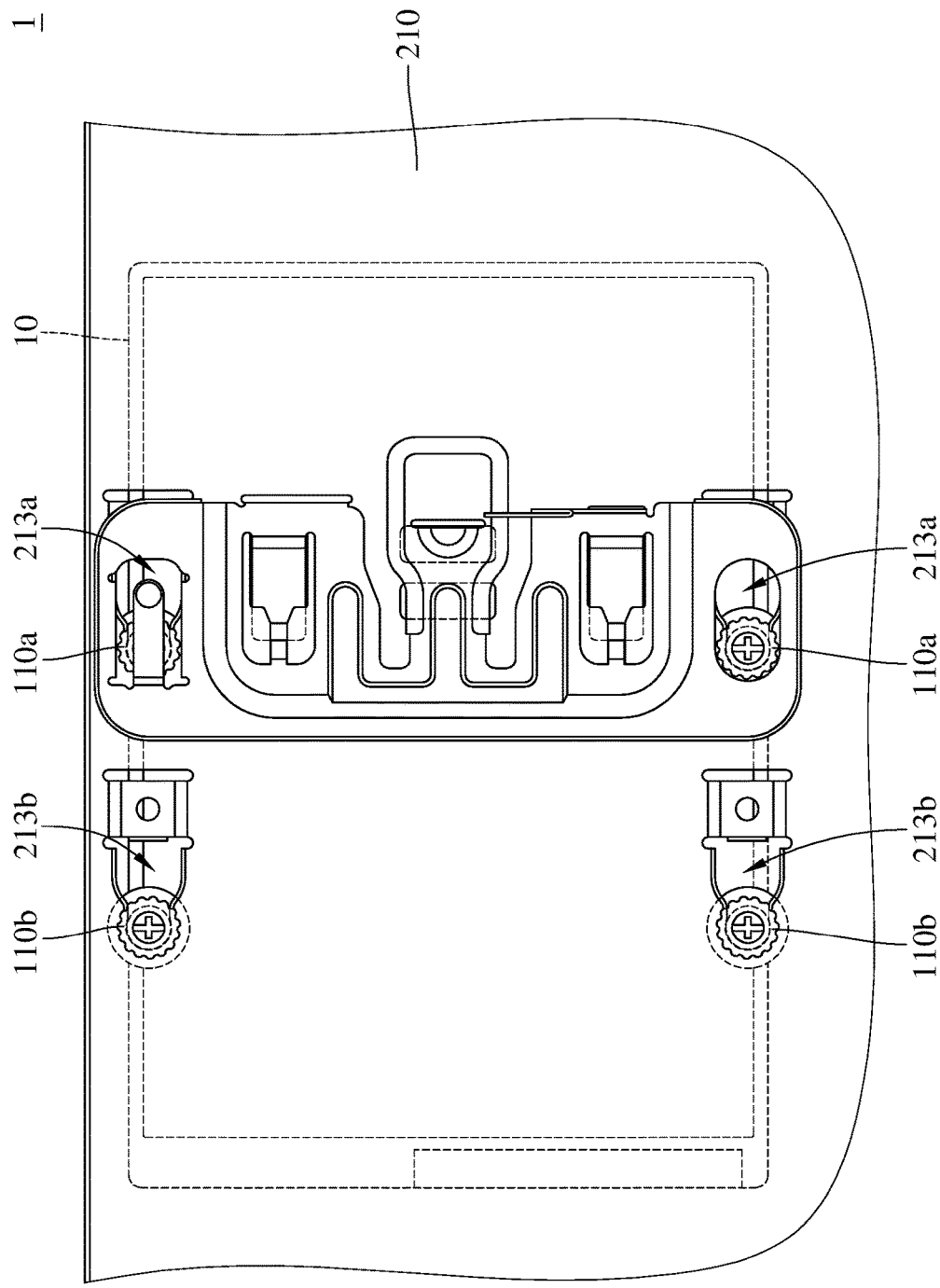
FIG. 10 is a planar view showing that the operation member in FIG. 1 is in the releasing position and the fasteners in FIG. 1 are located at retaining parts of the assembling slots.
Figure 11:
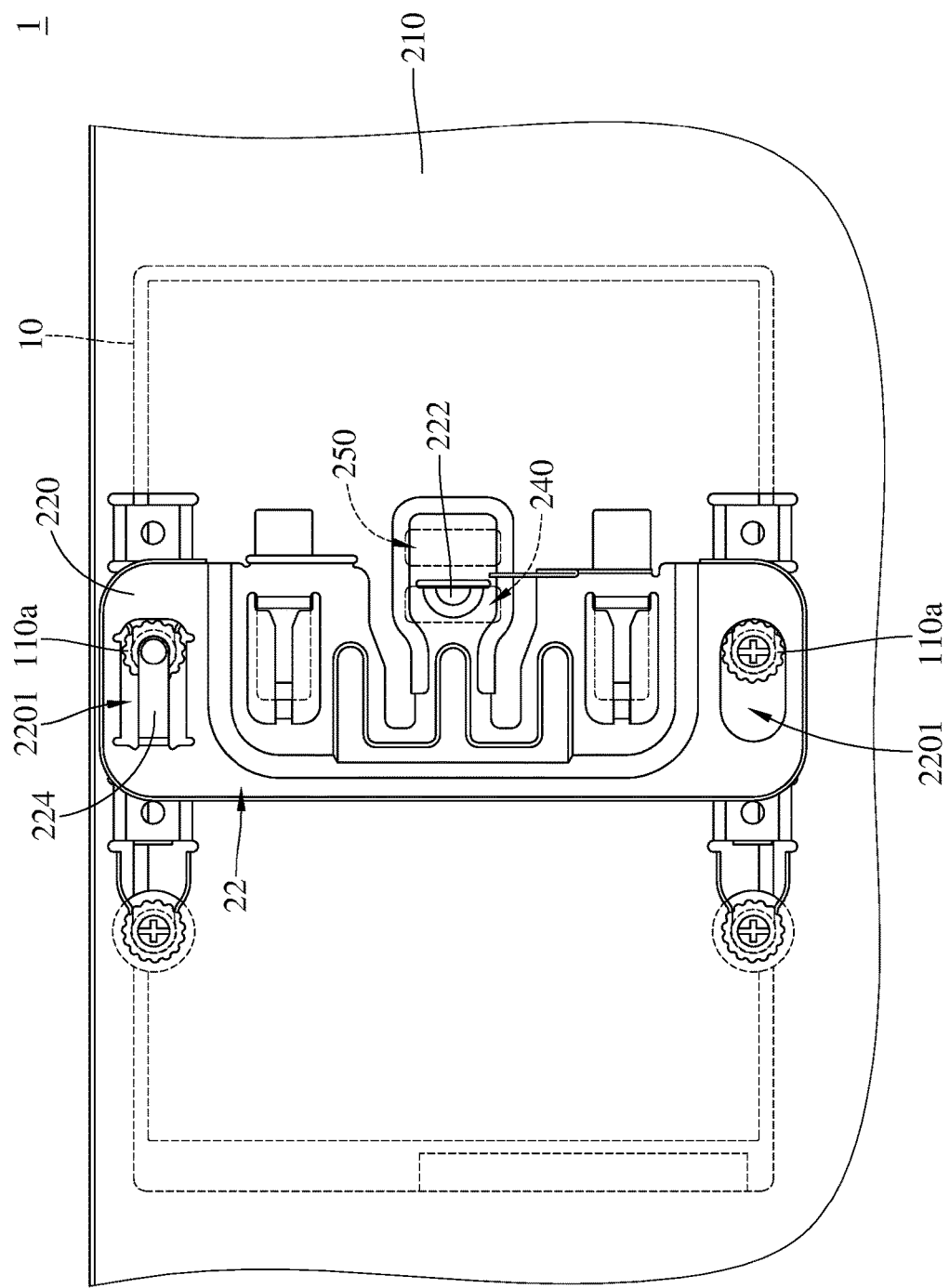
FIG. 11 is a planar view showing that the operation member in FIG. 1 is in a retaining position and the fasteners in FIG. 1 are located at the retaining parts of the assembling slots.

Refer to FIG. 7 to FIG. 11. FIG. 7 is a side view showing that the operation member in FIG. 1 is inclined relative to the front plate, FIG. 8 is a planar view showing that the operation member in FIG. 1 is in a releasing position with respect to the front plate, FIG. 9 is a planar view showing that the operation member in FIG. 1 is in the releasing position and fasteners in FIG. 1 are located at releasing parts of the assembling slots, FIG. 10 is a planar view showing that the operation member in FIG. 1 is in the releasing position and the fasteners in FIG. 1 are located at retaining parts of the assembling slots, and FIG. 11 is a planar view showing that the operation member in FIG. 1 is in a retaining position and the fasteners in FIG. 1 are located at the retaining parts of the assembling slots.

Firstly, the operation member 22 is preliminarily disposed on the front plate 210 of the chassis 21. In detail, as shown in FIG. 7, the operation member 22 is inclinedly placed on the first assembling surface 214 of the front plate 210, and then the first slide pieces 2211 of the second guiding parts 221 are respectively disposed through the first slot parts 2301 of the first guiding parts 230, and the second slide pieces 2212 are respectively disposed through the second slot parts 2302. Due to the step between the second guiding part 221 and the main body 220, a part of the first slide pieces 2211 and a part of the second slide pieces 2212 are inserted into the first assembling surface 214 and protrude from the second assembling surface 215. Then, the operation member 22 is moved toward the first side 211 until the second engaging part 222 is engaged with the third engaging part 250, and therefore the operation member 22 is in the releasing position (as shown in FIG. 8). At this moment, the second slide piece 2212 partially overlaps the first slot part 2301 and presses against the second assembling surface 215 of the front plate 210, the front plate 210 is clamped between the second guiding part 221 and the main body 220, thereby restricting the movement of the operation member 22 in a direction parallel to a normal vector of the first assembling surface 214.

The restriction of movement in the direction parallel to the short sides of the front plate 210 of the first slide pieces 2211 of the operation member 22 caused by the first slot parts 2301 of the chassis 21 of the casing 20 allows the operation member 22 to be moved along a predetermined direction (parallel to the long sides of the front plate 210) without deviation. Furthermore, since two ends of each of the second slide pieces 2212 are connected to the main body 220 (with one end indirectly connected to the main body 220 via the first slide piece 2211), the structural strength of the second guiding parts 221 is better than that of a second guiding part having a free end (i.e., only one end of the second guiding part is connected to the main body). Therefore, metal/elastic fatigue of the second guiding parts due to long periods of usage is prevented, such that the second guiding parts are still able to clamp the front plate after a long period of usage.

After the operation member 22 is disposed on the front plate 210 and in the releasing position, the data storage device 10 is then to be mounted onto the casing 20. In detail, as shown in FIG. 9, the data storage device 10 is placed on the second assembling surface 215 of the front plate 210 and let the fasteners 110a and 110b to be disposed through the releasing part 2132 of the assembling slots 213a and 213b. Then, as shown in FIG. 10, the data storage device 10 is moved toward the first side 211 until the fasteners 110a and 110b are moved into the retaining parts 2131 of the assembling slots 213a and 213b, and the edges of the front plate 210 forming the retaining parts 2131 are engaged in the engaging slots 1123 between the first annular protrusions 1121 and the second annular protrusions 1122 of the buffer sleeves 112.

Lastly, the operation member 22 is moved toward the first side 211 until the second engaging part 222 is disengaged from the third engaging part 250 and then engaged with the first engaging part 240. As such, the operation member 22 is in the retaining position (as shown in FIG. 11), and a portion of an inner surface of the main body 220 forming the movement restricting slots 2201 presses against one side of one of the fasteners 110a closer to the second side 212. As a result, the operation member 22 is configured to restrict the fasteners 110a, such that the data storage device 10 is fixed on the front plate 210. In addition, when the operation member 22 is in the retaining position, the elastic grounding arm 224 presses against the head part 1111 of the screw portion 111 of one of the fasteners 110a, thereby providing the data storage device 10 a grounding effect.

Figure 12:
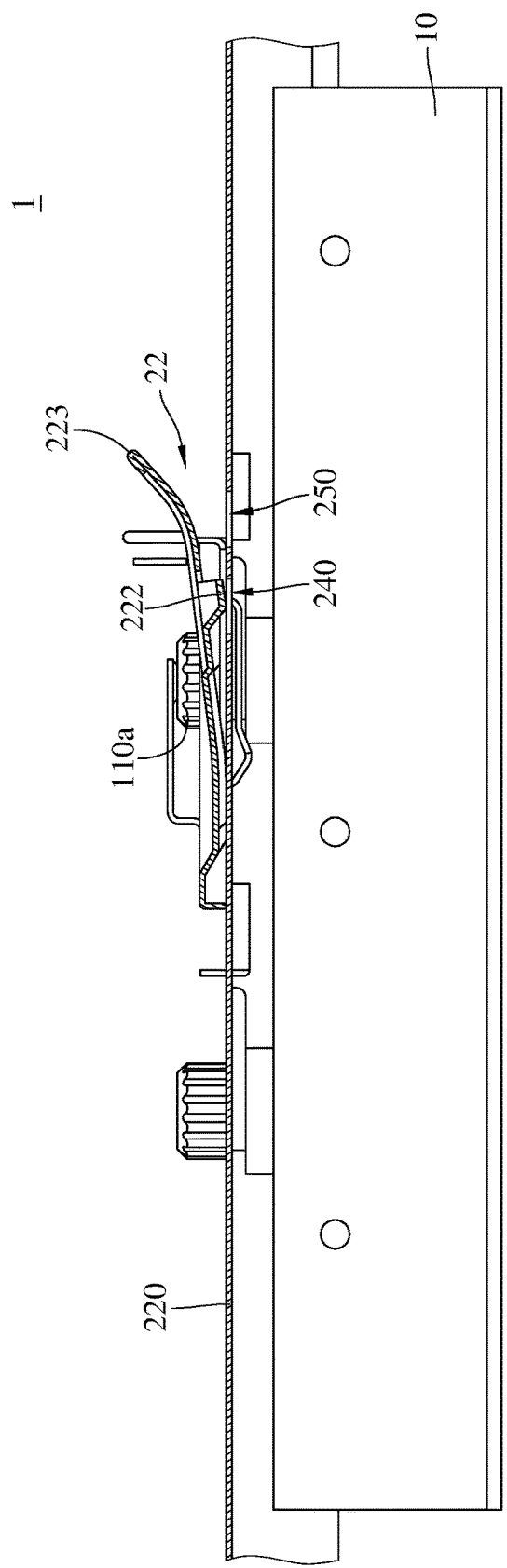
FIG. 12 is a side view showing that a second engaging part is disengaged from a first engaging part by an operating part of the operation member in FIG. 1.

Then, refer to FIG. 12, which is a side view showing that a second engaging part is disengaged from a first engaging part by an operating part of the operation member in FIG. 1. The following procedures are performed to remove the data storage device 10 from the front plate 201. Firstly, the operating part 223 is bent with respect to the main body 220 to disengage the second engaging part 222 from the first engaging part 240. Then, the operation member 22 is moved toward the second side 212 so as to engage the second engaging part 222 with the third engaging part 250 and to move the operation member 22 to the releasing position (as shown in FIG. 10). By doing so, the fasteners 110a are not restricted by the operation member 22, allowing the data storage device 10 to be removed from the front plate 210.

However, the present disclosure is not limited to the aforementioned assembly procedure. In other embodiments, the data storage device 10 may be placed on the front plate 210 before placing the operation member.

In this embodiment, the second guiding part 221 has two slide pieces which are different in width, and the first guiding part 230 has two slot parts which are different in width, but the present disclosure is not limited thereto. In other embodiments, both the second guiding part and the first guiding part may have a fixed width.

In addition, the first engaging part 240 and the third engaging part 250 are through holes and the second engaging part is protrusion. However, the present disclosure is not limited to the types of the first engaging part 240, the third engaging part 250, and the second engaging part 222. In other embodiments, the first engaging part and the second engaging part may respectively be the through hole or the protrusion, or the first engaging part and the second engaging part may be other structures that can be engaged with each other.

In addition, in this embodiment, the chassis 21 has two engaging parts (the first engaging part 240 and the third engaging part 250), but the present disclosure is not limited thereto. In other embodiments, the chassis may only have the first engaging part.

In addition, the present disclosure is not limited to the types of the first guiding part 230 and the second guiding part 221. In other embodiments, the first guiding part may be a slide piece similar to the second guiding part 221, and the second guiding part may be a through hole for the sliding of the slide piece; alternatively, the first guiding part and the second guiding part may be other structures that can be engaged with each other.

In this embodiment, the data storage device 10 is a 3.5-inch hard drive, but the present disclosure is not limited thereto. In other embodiments, the data storage device may be a 2.5-inch hard drive, such as 2.5-inch solid-state drive (SSD). However, the size of the 2.5-inch hard drive is smaller than that of the 3.5-inch hard drive, so the distance between the fasteners (e.g., shock absorbing screws) screwed on the 2.5-inch hard drive is smaller than that of the 3.5-inch hard drive. To match the size of the 2.5-inch hard drive, the positions of the two movement restricting slots and the two second guiding parts of the operation member should be exchanged; that is, the two movement restricting slots are located between the two second guiding parts so as to shorten the distance between the two movement restricting slots, such that the fasteners of the 2.5-inch hard drive can be disposed in the two movement restricting slots.

Figure 13:
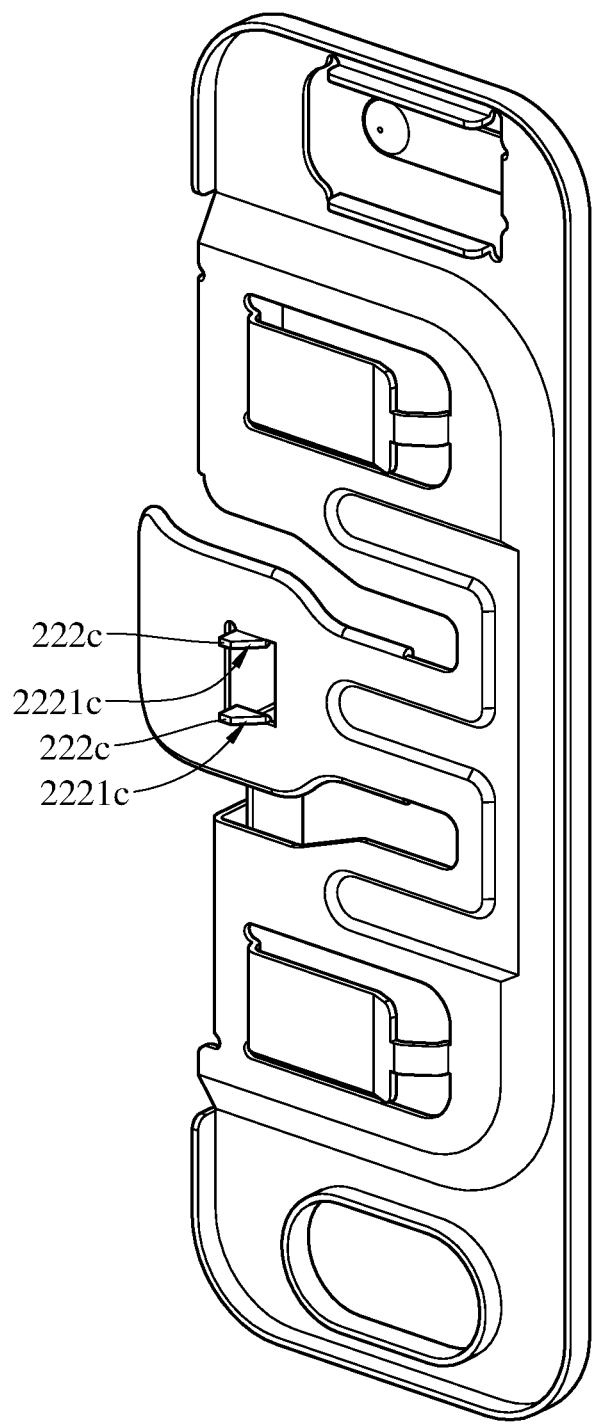
FIG. 13 is a perspective view of an operation member in accordance with a second embodiment of the disclosure.

In the first embodiment, the second engaging part 222 is a protrusion configured to engage with the first engaging part 240, but the present disclosure is not limited thereto. Refer to FIG. 13, which is a perspective view of an operation member in accordance with a second embodiment of the disclosure.

In this embodiment, a second engaging part of an operation member 22c has two protrusions 222c that can be engaged with the first engaging part, and each of the protrusions 222c has an inclined guiding surface 2221c.

In addition, in another embodiment, the fastener may have no buffer sleeve 112. For example, refer to FIG. 14, which is a partial perspective view of a computer in accordance with a third embodiment of the disclosure.

Figure 14:
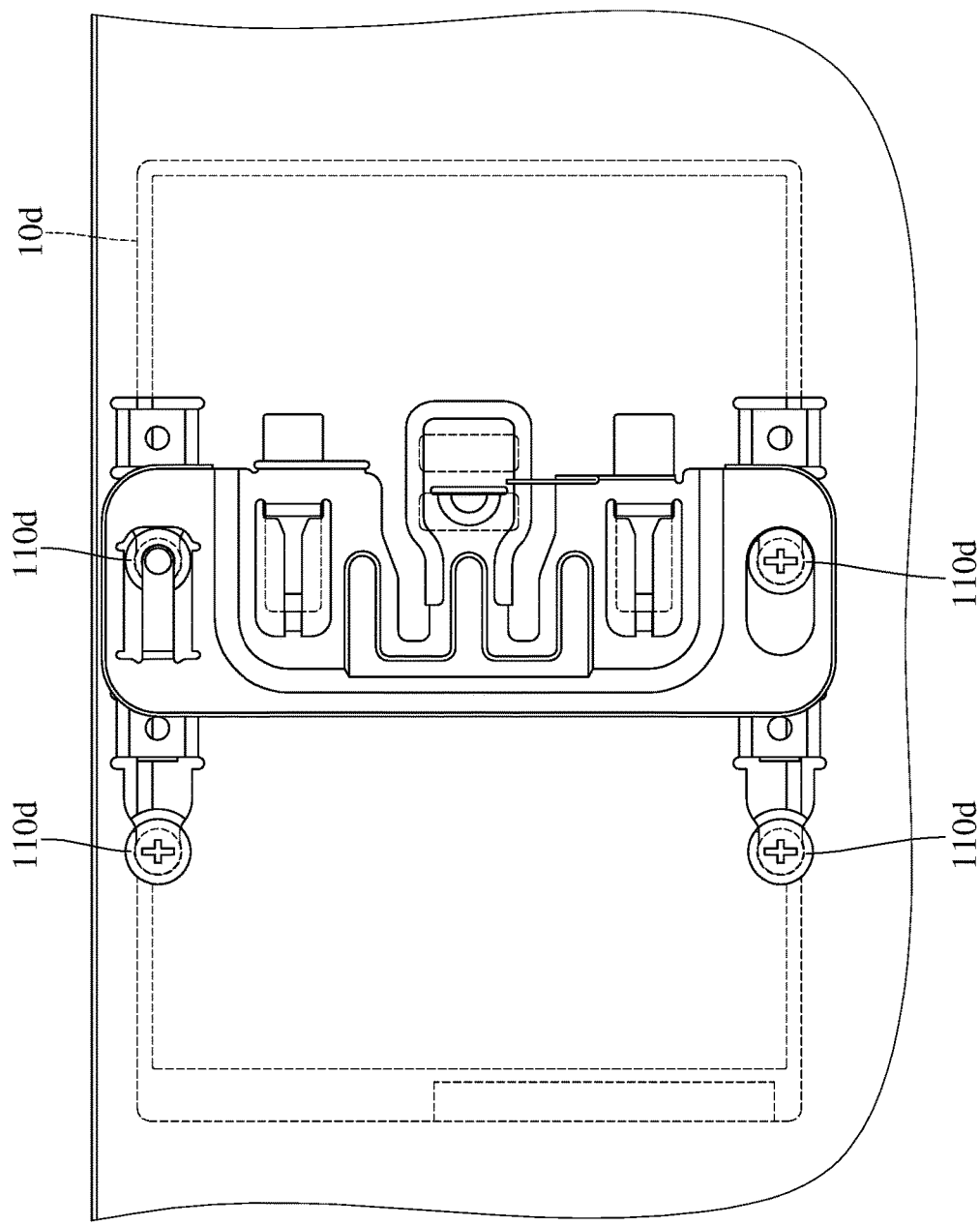
FIG. 14 is a partial perspective view of a computer in accordance with a third embodiment of the disclosure.

FIG. 14 shows a computer 1d, and the computer 1d includes a data storage device 10d having a high vibration resistance. In such a case, it is acceptable to use regular screws 110d to mount the data storage device 10d on the computer 1d. This helps to reduce the overall manufacturing cost.

According to the casing and the computer including the same as described above, the operation member of the casing is slidable between the retaining position and the releasing position on the front plate to position the fasteners, or allow the insertion and sliding of the fasteners. As such, the data storage device can be directly mounted on or detached from the casing by simply switching the operation member without additionally adding a bracket between the data storage device and the casing, thereby helping to reduce the manufacturing cost and meeting the requirement of easy installation and removal of the data storage device.

Additionally, the assembling slot has the releasing part and the retaining part for the insertion of the fastener, and the retaining part has the width smaller than the width of the first annular protrusion, thus the first annular protrusion can prevent the fastener from coming out of the retaining part of the assembling slot when the fastener is engaged into the retaining part.

Thus, the data storage device can be temporarily fixed on the front plate via the fasteners and the assembling slots. And then the operation member can be disposed on the front plate to fix the data storage device. That is, the data storage device can be mounted on the front plate without screwing, making the assembly of the computer much easier and more efficient.

On the other hand, the data storage device can be detached from the front plate when the operation member is moved to the releasing position. That is, it is also easy to remove the data storage device.

The embodiments were chosen and described in order to best explain the principles of the disclosure and its practical applications, to thereby enable others skilled in the art to best utilize the disclosure and various embodiments with various modifications as are suited to the particular use contemplated. It is intended that the scope of the disclosure be defined by the following claims and their equivalents.

What is claimed is:

1. A casing configured for a data storage device to be disposed thereon, comprising:
    a chassis, comprising a front plate, the front plate having a plurality of assembling slots, each of the plurality of assembling slots having a retaining part and a releasing part, wherein a width of the releasing part is larger than a width of the retaining part, the plurality of assembling slots are configured for a plurality of fasteners of the data storage device to be disposed therethrough, and the plurality of fasteners are configured to be slid between the retaining parts and the releasing parts of the plurality of assembling slots; and
    an operation member, being slidably disposed on the front plate and being slidable between a retaining position and a releasing position;
    wherein the operation member comprises a main body, and the main body has at least one movement restricting slot and an inner surface surrounding and forming the at least one movement restricting slot;
    when the plurality of fasteners are respectively disposed through the retaining parts and the operation member moves from the releasing position to the retaining position, a portion of the inner surface moves from a position away from the plurality of fasteners to a position configured to press against the plurality of fasteners to retain the plurality of fasteners at the retaining parts.

2. The casing according to claim 1, wherein the chassis further comprises a plurality of first guiding parts and a first engaging part, the plurality of first guiding parts and the first engaging part are located on the front plate, the operation member further comprises a plurality of second guiding parts and a second engaging part, the plurality of second guiding parts and the second engaging part are located on the main body, the plurality of second guiding parts respectively correspond to the plurality of first guiding parts, the second engaging part is detachably engaged with the first engaging part in order to position the operation member in the retaining position.

3. The casing according to claim 2, wherein each of the plurality of first guiding parts comprises a first slot part and a second slot part connected to the first slot part, a width of the second slot part is larger than a width of the first slot part, each of the plurality of second guiding parts comprises a first slide piece and a second slide piece, a width of the second slide piece is larger than a width of the first slide piece, and the width of the second slide piece is smaller or equal to the width of the second slot part;
    when the operation member is in the retaining position, the first slide pieces are respectively disposed through the first slot parts so that the second slide pieces are engaged with the front plate.

4. The casing according to claim 3, wherein the front plate has a first side and a second side opposite to each other, the retaining parts are closer to the first side than the releasing parts, the chassis further comprises a third engaging part located on the front plate, the first engaging part is closer to the first side than the third engaging part, the second engaging part of the operation member is selectively engaged with the first engaging part or the third engaging part;
    when the second engaging part of the operation member is engaged with the first engaging part, the operation member is in the retaining position;
    when the second engaging part of the operation member is engaged with the third engaging part, the operation member is in the releasing position.

5. The casing according to claim 4, wherein when the plurality of fasteners are respectively disposed through the retaining parts and the operation member is in the retaining position, the inner surface presses against one side of one of the fasteners closer to the second side.

6. The casing according to claim 5, wherein the operation member further comprises at least one elastic grounding arm connected to the main body and covering a part of the at least one movement restricting slot;
    when the operation member is in the retaining position, the at least one elastic grounding arm presses against one of the plurality of fasteners.

7. The casing according to claim 6, wherein the operation member further comprises an operating part connected to the second engaging part, and the operation part is configured to move the second engaging part, and to engage the second engaging part with the first engaging part or disengage from the first engaging part.

8. The casing according to claim 7, wherein the operation member further comprises a reinforcement protrusion protruding from an edge of the main body.

9. The casing according to claim 8, wherein the operation member further comprises a movement-restriction protrusion, and the movement-restriction protrusion is connected to the reinforcement protrusion and located at one side of the operating part away from the front plate.

10. A computer, comprising:
    a data storage device, comprising a device body and a plurality of fasteners disposed on the device body; and
    a casing, comprising:

a chassis, comprising a front plate, the front plate having a plurality of assembling slots, each of the plurality of assembling slots having a retaining part and a releasing part, wherein a width of the releasing part is larger than a width of the retaining part, the plurality of fasteners are slidably disposed through the plurality of assembling slots, and the plurality of fasteners are configured to be slid between the retaining parts and the releasing parts of the plurality of assembling slots; and an operation member, being slidably disposed on the front plate and being slidable between a retaining position and a releasing position;

wherein the operation member comprises a main body, and the main body has at least one movement restricting slot and an inner surface surrounding and forming the at least one movement restricting slot;

when the plurality of fasteners are respectively disposed through the retaining parts and the operation member moves from the releasing position to the retaining position, a portion of the inner surface moves from a position away from the plurality of fasteners to a position configured to press against the plurality of fasteners to retain the plurality of fasteners at the retaining parts.

11. The computer according to claim 10, wherein each of the plurality of fasteners comprises a screw portion and a buffer sleeve, the screw portion comprises a head part and a threaded part connected to each other, the threaded part is screwed into the device body, the buffer sleeve is sleeved on the head part, and the buffer sleeves are slidable with respect to the plurality of assembling slots.

12. The computer according to claim 11, wherein the buffer sleeve comprises a wrapping portion, a first annular protrusion, and a second annular protrusion, the wrapping portion is sleeved on the head part, the first annular protrusion and the second annular protrusion protrude from the wrapping portion, and the first annular protrusion is spaced apart from the second annular protrusion, and an engaging slot is formed between the first annular protrusion and the second annular protrusion;

when the plurality of fasteners are located at the retaining parts of the plurality of assembling slots, edges of the front plate surrounding and forming the retaining parts are engaged in the engaging slots.

13. The computer according to claim 12, wherein the second annular protrusion is located closer to the threaded part than the first annular protrusion, a length of the second annular protrusion protruding from the wrapping portion is larger than a length of the first annular protrusion protruding from the wrapping portion, and a width of the first annular protrusion ranges between the width of the retaining part and the width of the releasing part.

* * * * *